United States Patent [19]
Gast

[11] Patent Number: 5,833,177
[45] Date of Patent: Nov. 10, 1998

[54] AUTOPILOT/FLIGHT DIRECTOR OVERSPEED PROTECTION SYSTEM

[75] Inventor: Mark E. Gast, Seabrook, Tex.

[73] Assignee: The Boeing Company, Seattle, Wash.

[21] Appl. No.: 441,685

[22] Filed: May 15, 1995

[51] Int. Cl.$^6$ .................................................. G05D 1/00
[52] U.S. Cl. ........................... 244/195; 244/175; 244/182
[58] Field of Search .................. 244/195, 76 R, 244/182, 175, 180, 76 B, 194, 188, 177, 178, 179; 364/433; 343/424.098, 424.017

[56] References Cited

U.S. PATENT DOCUMENTS

| | | | |
|---|---|---|---|
| 3,399,850 | 9/1968 | Kramer et al. | 244/192 |
| 3,624,364 | 11/1971 | Dommasch | 235/150.2 |
| 3,627,236 | 12/1971 | Hess | 244/77 D |
| 3,691,356 | 9/1972 | Miller | 235/150.22 |
| 3,981,442 | 9/1976 | Smith | 244/182 |
| 3,998,411 | 12/1976 | Blecher | 244/188 |
| 4,471,439 | 9/1984 | Robbins et al. | 244/182 |
| 4,569,021 | 2/1986 | Larson et al. | 364/431.01 |
| 4,646,243 | 2/1987 | Graupp et al. | 244/182 |
| 4,764,872 | 8/1988 | Miller | 364/434 |
| 4,967,363 | 10/1990 | Bonafe | 364/427 |
| 5,079,711 | 1/1992 | Lambregts et al. | 244/182 |
| 5,096,146 | 3/1992 | Orgun et al. | 244/179 |
| 5,375,793 | 12/1994 | Rivron et al. | 244/75 R |
| 5,386,954 | 2/1995 | Bissey et al. | 244/181 |
| 5,408,413 | 4/1995 | Gonser et al. | 244/182 |
| 5,478,031 | 12/1995 | Piche | 244/195 |

*Primary Examiner*—Andres Kashnikow
*Assistant Examiner*—Tian Dinh
*Attorney, Agent, or Firm*—Seed and Berry LLP

[57] ABSTRACT

An aircraft overspeed protection system produces proportional and integral commands for input to an autopilot controlling the aircraft. The proportional and integral commands are produced by comparing actual monitored speed of the aircraft with a target speed from a target speed selector. The target speed selector selects as the target speed a trigger speed above a nominal maximum operating airspeed of the aircraft until the trigger speed is reached by the aircraft. When the trigger speed is reached by the aircraft, the overspeed control goes into Overspeed Protect Command active mode and the target speed selector selects a new target speed below the nominal maximum operating speed of the aircraft. The overspeed protection system remains in Overspeed Protect Command active mode until the pilot takes a positive action by selecting a new autopilot mode or by disengaging the autopilot. To accommodate for a reduced effectiveness of the overspeed protection system at severe roll angles, the overspeed proportional and integral commands are weighted by a weighting factor that is a function of the measured roll angle of the aircraft.

15 Claims, 5 Drawing Sheets

| I | $L_1$ | $L_2$ | $L_3$ | OUT |
|---|---|---|---|---|
| 1 | 1 | 1 | 1 | 1 |
| X | ANY 0 | | | 0 |

AUTOPILOT/FLIGHT DIRECTOR OVERSPEED PROTECTION SYSTEM

TECHNICAL FIELD

The present invention relates to aircraft flight control systems, and more particularly to an overspeed protection system for autopilots and flight directors.

BACKGROUND OF THE INVENTION

Aircraft flight control systems allow a pilot to control the orientation of an aircraft in three axes, namely yaw, pitch, and roll. The pitch axis extends along the wingspan of the aircraft, the roll axis extends along the length of the aircraft, and the yaw axis is perpendicular to both the pitch axis and the roll axis. The orientation of the aircraft about the yaw axis is controlled by foot pedals which deflect the aircraft's rudder from side-to-side. The orientation of the aircraft about the pitch axis is generally controlled by pushing or pulling on the control yoke to deflect the aircraft's elevator down or up, respectively. Finally, the orientation of the aircraft about the roll axis is generally controlled by rotating the control wheel in either direction to differentially deflect ailerons on the aircraft's wing.

In addition to being manipulated by the pilot, an aircraft's flight controls can also be controlled automatically by autopilots and yaw dampers. Autopilots manipulate the aircraft's ailerons to control the direction of flight in order to follow a heading or course set by the pilot. Autopilots also manipulate the aircraft's elevator to control the altitude of the aircraft in a "altitude hold" mode, or to control the rate of climb or descent of the aircraft in a vertical speed (vertical feet/second) or vertical profile or vertical navigation (vertical feet/mile). Yaw dampers manipulate the rudder to limit yawing of the aircraft in turbulence. The above-described autopilot modes are usually combined so that the autopilot is controlling simultaneously both the ailerons and the elevator. The autopilot may also combine modes for the same axis, such as when the "altitude capture" mode is selected. In the altitude capture mode, the autopilot operates in the vertical speed or vertical navigation mode to control the rate of descent or climb until a preset altitude is reached. The autopilot then automatically switches to the altitude hold mode to maintain the aircraft at the preset altitude.

Although aircraft flight controls can be controlled either manually or automatically, there is also a semi-automatic mode of operation using a flight director. A flight director receives command signal from the autopilot that would be used to control the aircraft flight controls. However, instead of actually controlling the flight controls, the command signals control the position of a flight director bar on the pilot's attitude indicator to tell the pilot how to manipulate the flight controls so that the airplane flies according to the preset flight profile. Thus, for example, the flight director tells the pilot to lower or raise the nose of the aircraft by pushing or pulling on the yoke so that the aircraft achieves a preset rate of climb or is maintained at a preset altitude. Similarly, the flight director tells the pilot to bank the airplane by rotating the control wheel so that the aircraft is turned to a desired heading.

For a given flight condition, the airspeed may be highly dependent upon several flight parameters, including the amount of thrust delivered by the engines. However, the autopilot typically does not control the thrust. Instead, the applied thrust is selected by the pilot. For this reason, the autopilot, or the pilot following the flight director's commands, may inadvertently place the airplane in an unsafe speed condition when the autopilot or the flight director is set to a new mode or the aircraft's flight conditions change. For example, the autopilot may be switched from a vertical speed mode in which the aircraft is climbing to an altitude hold mode in which the aircraft is maintained in level flight. The thrust applied to climb at a given airspeed is significantly greater than the thrust needed to fly in level flight at that same airspeed. Thus, if the thrust remains constant, the aircraft will fly at a higher airspeed after the autopilot or flight director is switched from the vertical speed mode to the altitude hold mode. In some cases, the increased speed may approach, or even exceed, a recommended maximum operating speed of the aircraft. If the pilot does not reduce the thrust or take some other action, such as changing the selected flight condition or mode, the aircraft could continue to fly above the recommended maximum operating speed.

To address this concern, aircraft have employed airspeed monitors coupled to warning systems to provide a warning to the pilot that the aircraft has exceeded the recommended maximum operating speed. Such aircraft relied upon the pilot to take some positive action, such as reducing the thrust, to reduce the airspeed below the recommended maximum operating speed.

SUMMARY OF THE INVENTION

An overspeed protection system and method overrides pilot selected autopilot commands in the event that the autopilot commands result in an aircraft overspeed condition. The overspeed protection system selects a nominal maximum allowable speed for the aircraft as the recommended maximum airspeed. A trigger speed above the nominal maximum allowable speed is then selected and compared to a monitored actual speed of the aircraft by comparing a first electrical signal corresponding to the trigger speed to a second electrical signal corresponding to the actual speed. If the actual speed of the aircraft exceeds the trigger speed, a first overspeed signal is supplied to an electronic flight controller. In response to the first overspeed signal, the overspeed protection system overrides the selected set of flight control parameters by supplying a revised flight control parameter to seek a revised flight condition in which the actual speed of the aircraft approaches a selected control speed below the nominal maximum allowable speed. The revised flight control parameter is maintained until either the pilot disengages the autopilot or the pilot selects a new set of flight control parameters.

To compensate for effects of altitude on the maximum operating speed of the aircraft, the nominal maximum allowable speed is specified both in actual airspeed and in mach. Then, the lesser of the airspeed-based maximum allowable speed and the mach-based maximum allowable airspeed is selected as the nominal maximum allowable speed.

To accommodate the inputs of conventional autopilots, the first overspeed signal is filtered and a second, unfiltered, overspeed signal is produced to complement the first overspeed signal. Both signals are supplied to the autopilot.

Because the overspeed control is undesirable at high roll angles, the first and second overspeed signals are weighted as a function of the roll angle. For roll angles from 0° to 30°, the overspeed signals are weighted by a factor of 1. At angles between 30° and 60°, the overspeed signals are weighted by a linearly decreasing value ranging from 1 to 0. At roll angles exceeding 60°, the weighting function is 0, such that the overspeed control is inactive.

To improve the rapidity of the response, the filtered, first overspeed signal is augmented by a forcing signal derived from the acceleration in the direction of flight when the autopilot is in flight path angle mode.

DETAILED DESCRIPTION OF THE INVENTION

Figure 1:
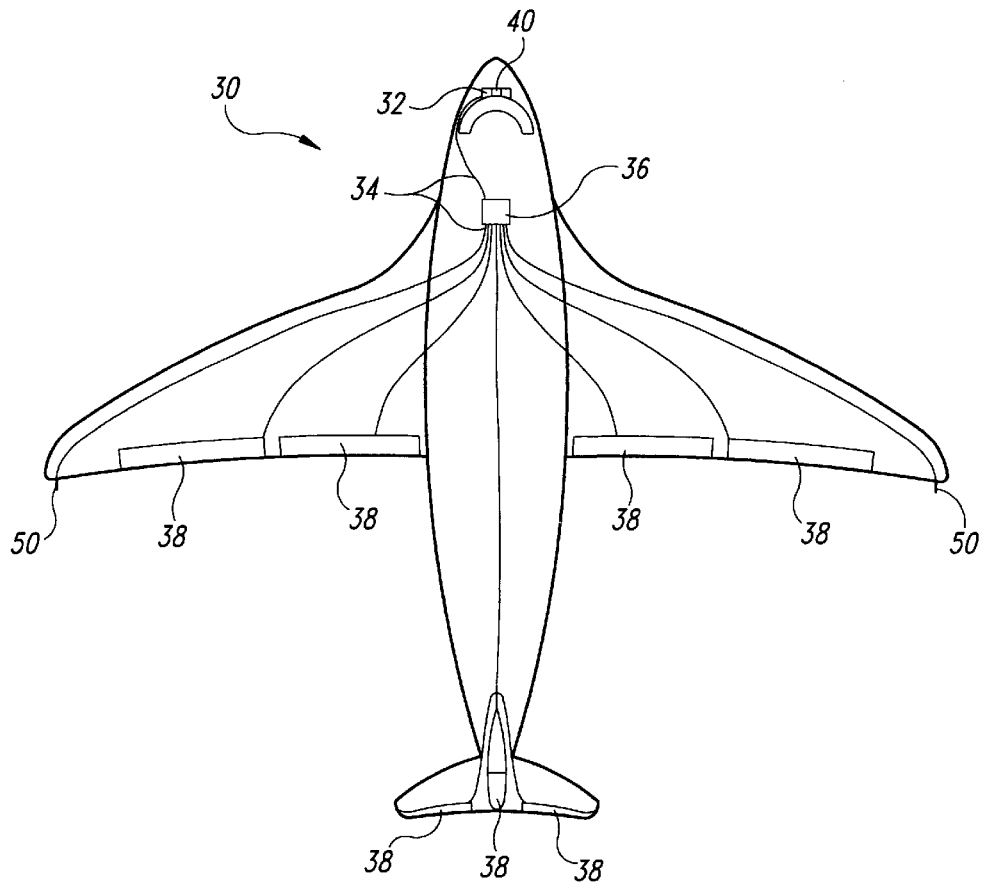
FIG. 1 is a plan view of a representative aircraft including an overspeed protection system, autopilot/flight director, and flight control system.

As shown in FIG. 1, an aircraft 30 operates under control of the either the pilot or an autopilot 32. The autopilot 32 is coupled through a control bus 34 to the flight control system 36 of the aircraft 30 which operates the flight control surfaces 38 such as the flaps, ailerons, elevators and rudder. In the preferred embodiment, the autopilot 32 is one of three autopilots (the master autopilot and two slave autopilots) operating cooperatively with each other. The autopilot 32 also includes a flight director interface for providing flight director commands to the pilot. Each of the autopilots 32 includes an overspeed protection system 40, as will be described below. Except as discussed below with respect to FIG. 4, each of the three autopilots 32 and its respective overspeed protection system 40 operates identically, and only one will be described herein.

Figure 2:
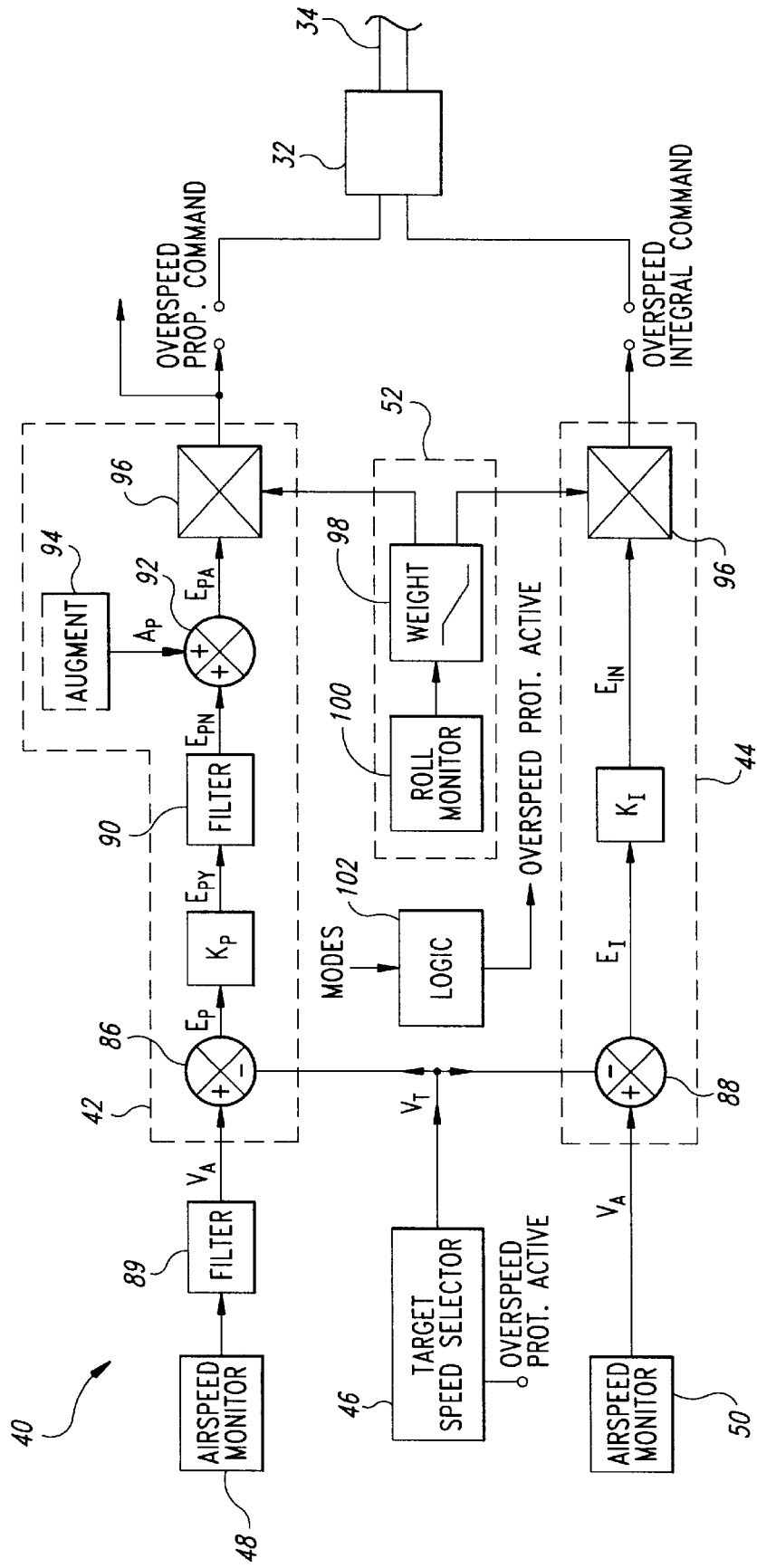
FIG. 2 is a block diagram of an overspeed protection system having proportional and integral overspeed command outputs.

The overspeed protection system 40, shown in greater detail in FIG. 2, includes an overspeed proportional signal generator 42 in parallel with an overspeed integral signal generator 44, driven by a target speed selector 46 and a respective airspeed monitor 48 or 50. The signal generators 42, 44 also receive signals from roll weight source 52 which provides a signal indicative of the roll angle of the aircraft. The overspeed proportional signal generator 42 produces an overspeed proportional command that is input to a proportional command input of the autopilot 32. Similarly, the overspeed integral signal generator 44 produces an overspeed integral command that is input to an integral command input of the autopilot 32. The autopilot 32 accepts the integral and proportional commands and controls the flight systems in response through a control bus 56.

As will be described hereinafter, the overspeed proportional command and the overspeed integral command are weighted error signals corresponding to the differences between an airspeed $V_{AS}$ and a target maximum airspeed $V_T$, as will be described hereinafter. Based upon the overspeed proportional and integral commands, the autopilot 32 adjusts the flight control systems, preferably the elevator, to alter the flight profile to minimize the differences between the airspeed $V_{AS}$ and the target maximum airspeed $V_T$ and thereby reduce the magnitude of the error signals. The target maximum airspeed $V_T$, which is selected by the target speed selector 46, as described hereinafter with respect to FIG. 2, is dependent upon a recommended maximum allowable speed $V_{MO}$ or $M_{MO}$ of the aircraft 30.

Figure 3:
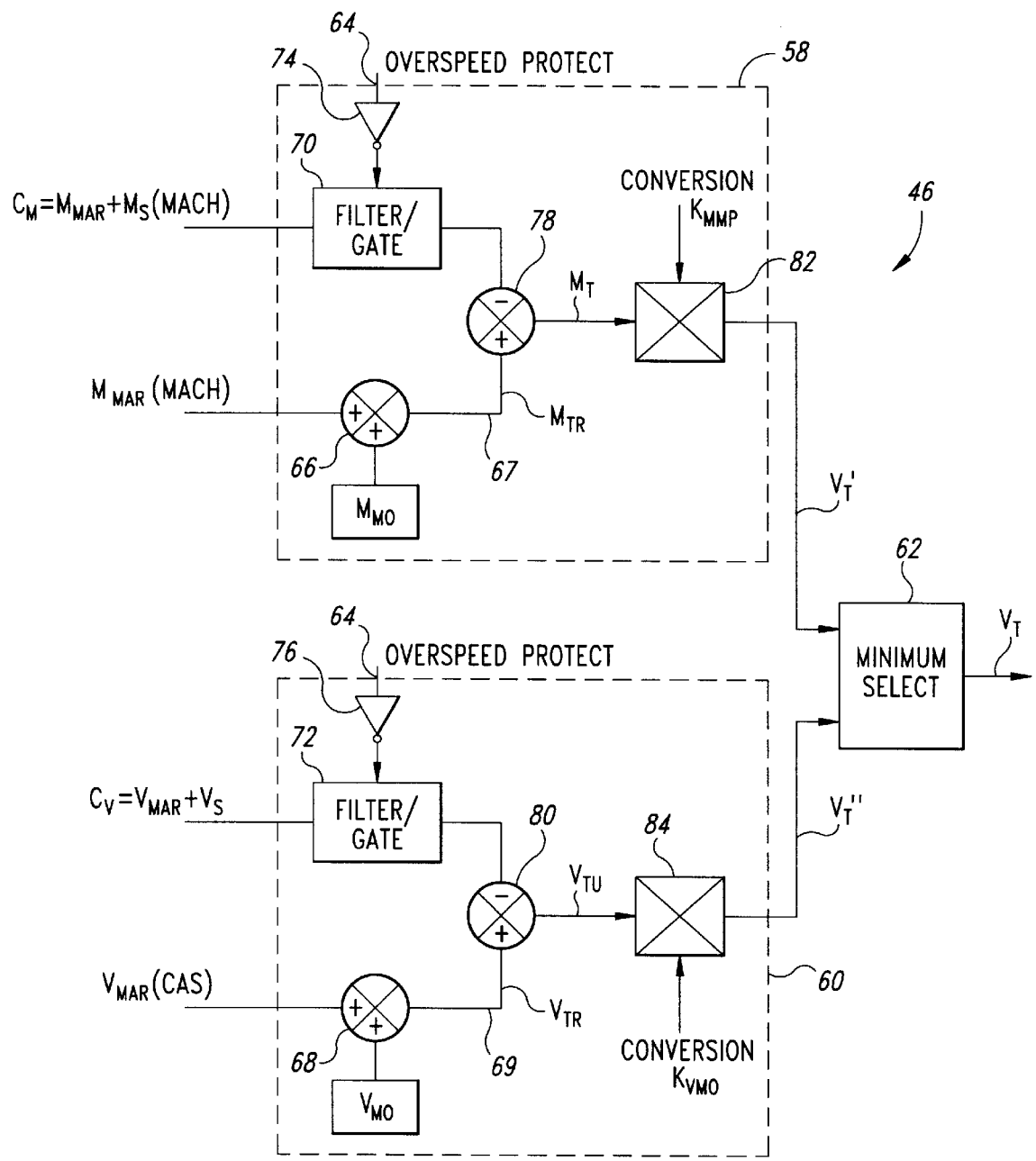
FIG. 3 is a block diagram of the target speed select subsystem used in the of FIG. 2.

The target speed selector 46, shown in greater detail in FIG. 3, selects the target speed $V_T$. The target speed selector 46 includes a mach section 58 and a calibrated airspeed (CAS) section 60 coupled to a minimum select circuit 62. The CAS section 60 and the mach section 58 produce respective voltages $V_T'$ and $V_T''$ corresponding to a maximum target airspeed that is input to the minimum select circuit 62. It will be understood by one skilled in the art that, unless the context indicates otherwise, airspeeds and other flight conditions (e.g., roll angle and impact pressure) can be represented by either digital words when the overspeed protection system is implemented by digital computer system or by corresponding electrical signals when the overspeed protection system is implemented in whole or in part by an analog system.

For clarity of presentation, the electrical signals will be referred to herein by their physical correspondents. The minimum select circuit 62 selects the lesser of the two maximum airspeeds $V_T'$ and $V_T''$ as the maximum allowable airspeed $V_T$.

The overspeed protection system 40 also includes a logic circuit 102 which generates various command signals, such as an Overspeed Protect Command, based on operating modes selected by the pilot and signals received from the autopilot 32. The logic circuit 102 is described in detail with reference to FIG. 4.

With further reference to FIG. 3, to produce the target airspeed $V_T'$, the mach section 58 utilizes three constant inputs and an Overspeed Active input 64. Following the lower arm of the mach section 58, the overspeed margin $M_{MAR}$ is added to the recommended maximum operating speed $M_{mo}$ at an adder 66 to produce the trigger speed $M_{TR}$. Following the upper arm of the mach section 58, a correction factor $C_M$ equal to the overspeed margin $M_{MAR}$ plus the safety margin $M_S$ is input to a filter/gate 70. The filter/gate 70 is actuated by the Overspeed Active input 64 through inverter 74 such that the filter/gate 70 passes the correction factor $C_M$ when an active Overspeed Protect Command from the logic circuit 102 (FIG. 2) is received at the Overspeed Active input 64. The output of the filter/gate 70 is subtracted from the trigger speed $M_{TR}$ at a second adder 78. The output of the second adder 78 is therefore equal to the trigger speed $M_{TR}$ minus the correction factor $C_M$ if the Overspeed Protect Command from the logic circuit 102 is active.

If the Overspeed Protect Command is inactive, the filter/gate 70 blocks the correction factor $C_M$ and the output of the second adder 78 is equal to the trigger speed $M_{TR}$. Because the correction factor $C_M$ is equal to the overspeed margin $M_{MAR}$ plus the safety margin $M_S$, the output of the second adder 78 when the Overspeed Protect Command is active is equal to the nominal maximum operating speed $M_{MO}$ minus the safety margin $M_S$. The outputs of the second adder 78 is then normalized to a true target airspeed $V_T'$ at a multiplier 82 prior to input to the minimum select circuit 62.

The mach section 58 thus outputs as the target speed $V_T'$ a normalized value of trigger speed $M_{TR}$ until the trigger speed $M_{TR}$ is reached. After the aircraft exceeds the trigger speed $M_{TR}$, the mach section 58 outputs a normalized target speed $M_T$ equal to the recommended maximum operating speed $M_{MO}$ less a safety margin $M_S$.

The operation of the calibrated airspeed (CAS) section 60 is essentially the same as the operation of the mach section 58 as described above. Thus, to produce the target airspeed $V_T''$, the CAS section 60 utilizes three constant inputs and an Overspeed Active input 64. Following the lower arm of the CAS section 60, the overspeed margin $V_{MAR}$ is added to a recommended maximum operating speed $V_{MO}$ at an adder 68 to produce the trigger speed $V_{TR}$. Following the upper arm of the CAS section 60, a correction factor $C_V$ equal to the overspeed margin $V_{MAR}$ plus a safety margin $V_S$ is input to a filter/gate 72. The filter/gate 72 is actuated by the Overspeed Active input 64 through inverter 76 such that the filter/gate 72 passes the correction factor $C_V$ when an Overspeed Protect Command in an "active" state (as described with respect to FIG. 4) is received at the Overspeed Active input 64. The output $V_{TU}$ of the filter/gate 72 is subtracted from the trigger speed $V_{TR}$ at a second adder 80. The output of the second adder 80 is therefore equal to the trigger speed $V_{TR}$ minus the correction factor $C_V$ if the Overspeed Protect Command is active.

If the Overspeed Protect Command is inactive, the filter/gate 72 blocks the correction factor $C_V$ and the output of the second adder 80 is equal to the trigger speed $V_{TR}$. Because the correction factor $C_V$ is equal to the overspeed margin $V_{MAR}$ plus the safety margin $V_S$, the output of the second adder 80 when the Overspeed Protect Command is active is equal to the nominal maximum operating speed $V_{MO}$ minus the safety margin $V_S$. The output of the second adder 80 is then normalized to a true target airspeed $V_T''$ at a multiplier 84 prior to input to the minimum select circuit 62.

The CAS section 60 thus outputs as the target speed $V_T''$ a normalized value of trigger speed $V_{TR}$ until the trigger speed $V_{TR}$ is reached. After the aircraft exceeds the trigger speed $V_{TR}$, the CAS section 60 outputs a normalized target speed $V_{TU}$ equal to the recommended maximum operating speed $V_{MO}$ less a safety margin $V_S$.

A numerical example of the above description is instructive. In the example, the nominal maximum operating speed $V_{MO}$ is 330 kt., the overspeed margin $V_{MAR}$ is 20 kt. and the safety margin $V_A$ is 5 kt. In the lower arm of the CAS section 60, the nominal maximum operating speed $V_{MO}$ (330 kt.) and the overspeed margin $V_{MAR}$ (20 kt.) are added at the first adder 68 to produce the trigger speed $V_{TR}$ (350 kt.) at the output of the first adder 68. When the Overspeed Protect Command is not active, the trigger speed $V_{TR}$ of 350 kt. is passed directly to the multiplier 84 and the normalized trigger speed $V_{TR}$ is input to the minimum select 62 as the target airspeed $V_T''$.

In the upper arm of the CAS section 60, the correction factor $C_V$ equals the safety margin $V_S$ of 5 kt. plus the overspeed margin $V_{MAR}$ of 20 kt., giving a correction factor $C_V$ of 25 kt. When the Overspeed Protect Command is active, the correction factor $C_V$ (25 kt.) is subtracted at the second adder 80 from the trigger speed $V_{TR}$ (350 kt.) giving a target speed $V_{TU}$ of 325 kt. which is normalized by the multiplier 84 to provide the true target airspeed $V_T''$ which is input to the minimum select circuit 62. Thus, the trigger speed $V_{TR}$ will be 350 kt. ($V_{MO}+V_{MAR}$) and the target speed $V_{TU}$ after triggering will be 325 kt. ($V_{MO}+V_{MAR}-(V_{MAR}+V_S)$).

A similar example for the mach section 58 utilizes a nominal maximum operating speed $M_{MO}$ of 0.87 mach, an overspeed margin $M_{MAR}$ of 0.03 mach, and a safety margin $M_S$ of 0.01 mach. In such a case, the correction factor $C_M$ equals 0.04 mach and the target airspeed $M_T$ will equal 0.9 mach when the Overspeed Protect Command is not active. The target airspeed $M_T$ will equal 0.86 mach when the Overspeed Protect Command is active. In each case, the target airspeed $M_T$ is converted to a true airspeed $V_T'$ for input to the minimum select circuit 62.

Returning to the block diagram of FIG. 2, the target maximum airspeed $V_T$ selected by the target speed selector 46 from the target airspeeds $V_T'$ and $V_T''$ is input to the overspeed proportional signal generator 42 and the overspeed integral signal generator 44. In each case, the target maximum airspeed $V_T$ is subtracted from the actual airspeed $V_A$, as determined by the airspeed monitors 48 or 50, at a respective adder 86, 88 to get an error signal $E_p$ or $E_i$, respectively. The airspeed monitor 48 provides an airspeed determined by the autopilot 32 and smoothed by a filter 89. The airspeed monitor 50 provides an airspeed derived from a Pitot tube-type airspeed detector mounted on an external surface of the aircraft 30.

The error signals $E_p$ and $E_i$ from the adders 86, 88 are then normalized by a constant $K_p$ or $K_i$ to produce a normalized error signal $E_{PN}$ or $E_{IN}$. As will be described hereinafter, the normalized proportional error signal $E_{PN}$ is filtered at a filter 90 and augmented at an adder 92 by an augmentation signal $A_p$ from an augmentation circuit 94 to produce an augmented error signal $E_{pa}$. The augmented proportional error signal $E_{pa}$ and the normalized integral error signal $E_{IN}$ are then weighted at respective multipliers 96 by weighting factors from the roll weight source 52 to produce the overspeed proportional command and overspeed integral commands, respectively.

The roll weight source 52 provides the weighting factor from a function table 98 as a function of the roll angle $\phi$, where the roll angle $\phi$ as determined by a roll monitor 100. The roll monitor 100 uses a signal derived from a conventional avionics device, such as an attitude indicator. As established in the function table 98 and shown graphically in FIG. 5, the weighting factor equals 1.0 when the aircraft is at a roll angle between 0° and 30°, such that the weighting factor has no effect on the overspeed proportional and overspeed integral commands. At angles above 30°, autopilot responses to overspeed corrections have decreasing effectiveness due to the roll of the aircraft 30. Accordingly, the weighting factor from the function table 98 is decreased linearly for roll angles $\phi$ from 30° to 60°. At roll angles $\phi$ greater than 60°, conventional overspeed protection approaches have little or no effectiveness due to the severe roll of the aircraft 30. Consequently, at roll angles $\phi$ greater than 60°, the weight factor is 0 such that the overspeed integral and proportional commands will be 0.

Figure 4:
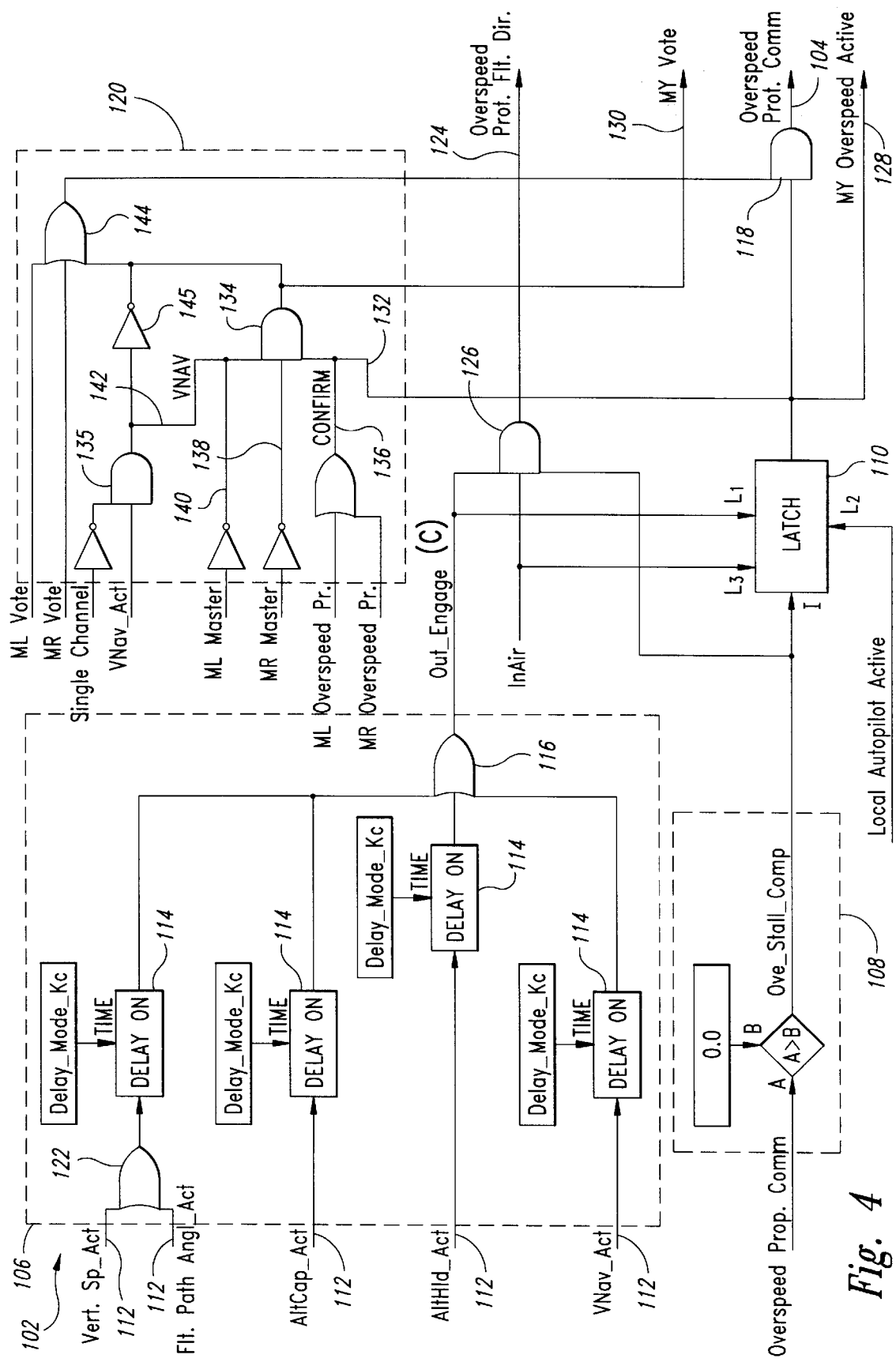
FIG. 4 is a logic diagram of an overspeed protection controller for controlling the overspeed protection system of FIG. 2.

As discussed above, the overspeed protection system 40 responds to a number of command signals, including an the Overspeed Protect Command, generated by the logic circuit 102. As shown in FIG. 4, the logic circuit 102 is driven principally by an active mode section 106 and an overspeed detector 108, each coupled to a central latch 110.

The output of the overspeed detector 108 is input to an initializing input I of the latch. The overspeed detector 108 produces a "1" if the overspeed proportional command from the overspeed protection system 40 is greater than 0 (i.e., the monitored airspeed $V_A$ is greater than the target airspeed $V_T$). The active mode section 106 produces a "1" if any one of a selected group of autopilot modes is active. In the preferred embodiment, the selected autopilot modes are vertical speed, flight path angle, altitude capture, altitude hold, and vertical navigation. If any one of the selected modes is active, a "1" is provided at a respective input 112 of the active mode section 106 and coupled through a respective delay ON 114 to an input of an OR gate 116. The OR gate 116 produces a "1" if any of the selected modes is active. The output of the OR gate 116 is input to the latch 110 at one of three latch inputs L1. The remaining two latch inputs L3, 1,2 are coupled to an In-Air line and a Local Autopilot Active line to ensure that the Overspeed Protect Command goes active only when the local autopilot is engaged and the aircraft 30 is in the air.

Figures 5, 6:
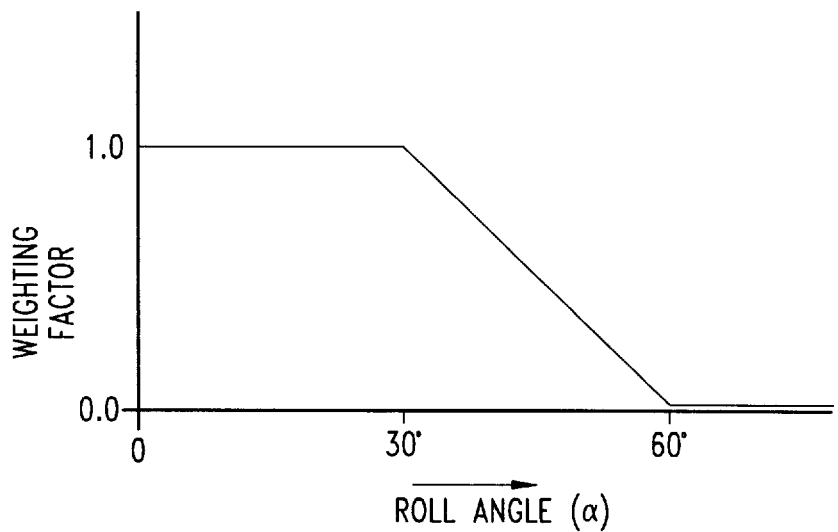
FIG. 5 is a graphical representation of roll weighting as a function of roll angle.
FIG. 6 is a logic diagram for a latch circuit within the overspeed protection system of FIG. 2.

Operation of the latch 110 is best described with respect to the logic table of FIG. 6. As can be seen from the logic table, the output of the latch will be "0" until the initialization input and the three latch inputs are all at a "1." Assuming the aircraft 30 has not reached an overspeed condition since it has become "in air" or since the autopilot was activated, the output of the latch 110 will be "0." Only when the overspeed detector 108 determines that the aircraft has exceeded the target airspeed $V_T$ (at this point, the trigger speed $V_{TR}$ or $M_{TR}$, whichever is lower) will it provide a "1" to the initialization input of the latch 110. If the autopilot is engaged, latch input L2 will be a "1," and if the aircraft is in flight, latch input L3 will be at a "1." If one of the selected modes is active, the final latch (latch L1) will be at a "1." When all of these conditions are satisfied, the latch 110 will output a "1" to an output AND gate 118 (FIG. 4).

The second input of the AND gate 118 is connected to an output of a voting section 120. As will be described hereinafter, the voting section 120 ensures that either a majority of the aircraft's three overspeed protection systems 40 or the overspeed protection system 40 designated as the master has determined that the Overspeed Protect Command should go active.

Returning to the logic diagram of FIG. 6, once the output of the latch 110 goes high, it will remain high until one of the three latch inputs L1, L2, or L3 goes low. This will occur when the local autopilot 32 is disengaged, if the plane is no longer in air, or if the output of the active mode section 106 goes low. As discussed above, if any of the selected modes is active, the active mode section 106, in its steady state, will output a "1." If all of the selected modes are inactive, the active mode section 106 will output a "0."

To allow the pilot to exit overspeed control without disengaging the autopilot 32 or landing the aircraft 30, the overspeed protection system 40 provides a third or "transient" state. In particular, the delay ON blocks 114 cause the active mode circuit 106 to produce a "transient 0" in response to selection of a new active mode. An example of a mode switch demonstrates the development of the "transient 0." If, initially, the altitude capture mode is active, the output of the second delay ON block 114 will be a "1." If the active mode is switched from altitude capture to vertical navigation, the output of the second delay ON box 114 will go low immediately, as delay is imposed only upon a transition from OFF to ON. The input to the fourth delay ON block 114 (vertical navigation) will go high immediately; however, the output of the fourth delay ON block 114 will not go high in response to the vertical navigation going active until after a selected delay period τ. The output of all of the delay ON blocks 114 will be zero until the output of the fourth delay ON block 114 goes high at the end of the delay period τ. Consequently, the output of the OR gate 116 (and thus latch input L1) will be low for the brief delay period τ after the new active mode is selected. In response, the output of the latch 110 will return to the "0" logic state until the conditions above (overspeed detected, autopilot engaged, in air, and selected mode active) are satisfied. Thus, to exit overspeed protection, the pilot may simply switch between selected modes.

The approach of switching between modes will not work in the unique case where the pilot switches between vertical speed mode and flight path angle mode, due to the inclusion of an OR 122 gate before the first delay ON block 114. The OR gate 122 links both the vertical speed mode input 112 and the flight path angle mode input 112 to the same delay ON block 114, such that the active mode section does not recognize a switch between vertical speed mode and flight path angle mode as a pilot action terminating overspeed protection.

In addition to producing the Overspeed Protect Command at its output 104, the logic circuit 102 also produces an Overspeed Protect Flight Director signal at an output 124 by combining the output of the active mode section 106, the in-air line and the output of the overspeed detector 108 at an AND gate 126. The AND gate sets the Overspeed Protect Flight Director signal high only when a selected mode is active, the aircraft is in air, and the monitored velocity exceeds the target velocity $V_T$.

In addition to the previously described signals, the logic circuit 102 also produces a MY Overspeed Active signal at a MY output 128 and a MY Vote signal at a MY Vote output 130, where the prefix MY designates the signal as originating at the subject overspeed protection system 40. According to this convention, the prefixes ML and MR represent the left adjacent ("my left") and right adjacent ("my right") overspeed protection systems.

The MY Overspeed Active signal is simply the output of the latch 110 and represents that the subject overspeed protection system 40 has determined that the Overspeed Protect Command should be active. The MY Vote signal is a logical AND combination of the MY Overspeed Active signal at a first input 132 of a voting AND gate 134, a confirm signal at a second input 136 of the voting AND gate 134, two slave-NOT signals at third and fourth inputs 138, 140 and a vertical navigation exception signal at a fifth input 142.

The confirm signal on the second input 136 is an OR'ed combination of the ML and MR Overspeed Active signals supplied by the remaining two overspeed protection systems 40. If either of the ML or MR overspeed protection systems 40 agrees that the Overspeed Protect Command should be active, the confirm signal is a "1." The Master-NOT signals come from the autopilots 32 and are both "1" only if the subject autopilot 32 is the Master autopilot (i.e., the ML autopilot and the MR autopilot are not the master).

The output of the voting AND gate 134 will therefore not be "1" unless the logic circuit 102 is associated with the Master autopilot (lines 138, 140), the logic circuit 102 determines that the Overspeed Protect Command should be active (line 132), and one of the adjacent overspeed protection systems 40 confirms that the Overspeed Protect Command should be active (line 136).

A further condition to the MY Vote signal is imposed at the remaining input of the voting AND gate 134. The condition comes from a limiting AND gate 135 and limits the voting procedure to the specific situation in which the selected mode is vertical navigation and more than a single autopilot 32 is active. Note that a single autopilot 32 cannot be engaged by the pilot. A single autopilot 32 can only be active when multiple autopilots have been engaged and one or more autopilots have failed, leaving only a single autopilot 32 active. When multiple autopilots 32 are engaged and the aircraft 30 is in vertical navigation mode, the limiting AND gate 135 outputs a "1." The voting AND gate 134 is then enabled. The output of the voting AND gate 134 provides one input to an output OR gate 144 having as two of its remaining inputs the ML and MR Votes of the logic circuits 102 of the remaining two autopilots. The output of the limiting AND gate 135 can be ignored as the corresponding input of the OR gate 144 will see a "0."

When the autopilot 32 is in any other mode or when only a single autopilot is engaged, the voting AND gate 134 is disabled and MY Vote is inactive. However, the Overspeed Protect Active command will be active because the output of the OR gate 144 will always provide a "1" to the output AND gate 118 if the autopilot 32 is not in vertical navigation mode or only a single autopilot 32 is engaged.

As can be seen from the above discussion of the Master-NOT signals 138 and 140, if the current logic circuit 102 is associated with the Master autopilot 32, the voting output of the remaining two (slave) autopilots 32 will be zero. If, however, the current logic circuit 102 corresponds a slave autopilot 32, one of the remaining two autopilots must be the Master autopilot 32. In such a case, if the logic circuit 102 associated with the Master autopilot votes to activate the Overspeed Protect command (the MY Vote signal from the remaining Slave will be a "0" because it is a slave discussed above for Master-NOT signals 138, 140), the output of the output OR gate 144 will be a "1," enabling the output AND gate 118 to be a "1."

Figure 7:
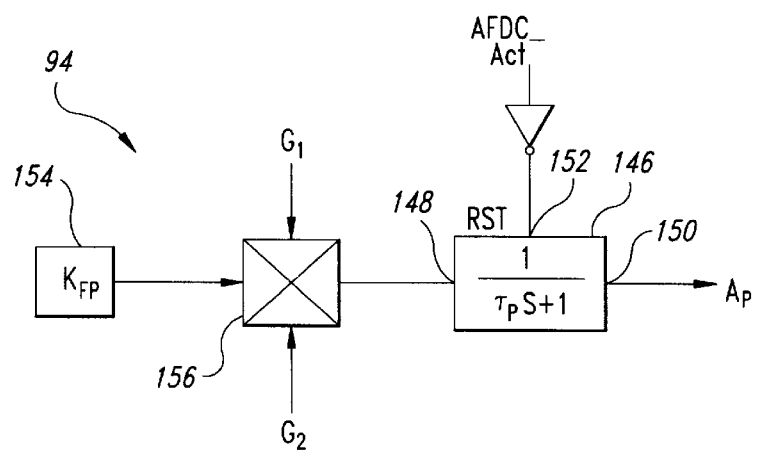
FIG. 7 is a detail of a portion of the block diagram of FIG. 2 showing an augmentation circuit.

To improve the response of the autopilot 32 to the overspeed proportional command, the overspeed proportional command is augmented by an augmentation signal from the augmentation circuit 94. The augmentation circuit 94 is shown in greater detail in FIG. 7, and includes as its central element a filter/gate 146. The filter/gate 146 is a gated, low-pass filter having a signal input 148, a signal output 150, and a reset input 152. The signal input 148 is driven by a fixed driving function 154 corresponding to a flight path acceleration constant $K_{FP}$. Before being input to the filter/gate 146, the driving function 154 is weighted by a pair of gains G1, G2 at a multiplier 156. The gains G1, G2 are variable gains dependent upon the measured flight path acceleration from the autopilot 32 and an impact from a Pitot tube (not shown) mounted to an external surface of the aircraft 30. The output of the multiplier 156 thus forms a varying driving function for input to the filter/gate 146. The filter/gate 146 is a low-pass filter having a transfer function $H(s)=1/[\tau s+1]$, where $\tau$ is a function of the impact pressure in the Pitot tube.

The operation of the filter/gate 146 is controlled by the input signal to the reset input 152. When the input signal to the reset input 152 is a "1," corresponding to the autopilot 32 being inactive, the filter/gate 146 passes the driving function from the multiplier 156 unchanged. When the input to the reset input 152 is a "0," corresponding to the autopilot 32 being active, the filter/gate 146 filters the driving function. In either case, the augmentation circuit 94 provides the augmentation signal $A_p$, either filtered or unfiltered, at the adder 92 to augment the normalized, filtered air signal $E_{PN}$.

While various embodiments have been described in this application for illustrative purposes, the claims are not limited to the embodiments described herein. Equivalent devices or steps may be substituted for those described, and operate according to principles of the present invention and fall within the scope of the claims.

I claim:

1. A method for limiting overspeed in an aircraft under autopilot control, the autopilot establishing a set of flight control parameters to seek a selected flight condition of the aircraft, comprising the steps of:

selecting a trigger speed;
monitoring an actual speed of the aircraft;
selecting a control speed below the trigger speed;
comparing the actual speed to the trigger speed;
if the actual speed of the aircraft exceeds the trigger speed, producing a first overspeed signal;
supplying the first overspeed signal to an electronic controller;
in response to the first overspeed signal, overriding the set of flight control parameters with the electronic controller by supplying a revised set of flight control parameters to seek a revised flight condition in which the actual speed of the aircraft approaches the control speed; and
after overriding the set of flight control parameters, maintaining the revised flight control parameters until either the autopilot is disengaged or a new set of flight control parameters is selected by a pilot.

2. The method of claim 1 further including the step of selecting a nominal maximum speed by:

selecting a mach-based maximum speed for a monitored flight condition;
selecting a first airspeed-based maximum speed for a monitored flight condition;
monitoring a flight altitude;
determining a second airspeed-based maximum speed at the monitored altitude by converting the mach-based maximum speed at the monitored altitude to an airspeed-based maximum speed; and
selecting the lesser of the first and second airspeed-based maximum speeds.

3. The method of claim 2 wherein the step of selecting a trigger speed includes the steps of:

selecting an overspeed margin; and
adding the overspeed margin to the nominal maximum allowable speed.

4. The method of claim 1 wherein the step of supplying a revised set of flight parameters includes the steps of:

producing a control signal proportional to the difference between the actual speed and the control speed; and
transmitting the control signal to the autopilot.

5. The method of claim 4, further including the step of monitoring a roll angle of the aircraft and wherein the step of producing a first control signal includes the step of weighting the signal proportional to the difference between the actual speed and the control speed in response to the monitored roll angle.

6. The method of claim 5, further including the steps of:

if the actual speed of the aircraft exceeds the trigger speed, producing a second control signal proportional to the difference between the control speed and the actual speed; and
filtering the second control signal to produce a filtered control signal.

7. The method of claim 6, further including the steps of:

monitoring a roll angle of the aircraft; and
weighting the second control signal in response to the monitored roll angle.

8. The method of claim 5 wherein the step of weighting the signal proportional to the difference between the actual speed and the control speed in response to the monitored roll angle includes the steps of:

if the roll angle is between 0 degrees and 30 degrees, multiplying the signal proportional to the difference between the actual speed and the control speed by one;
if the roll angle is between 30 degrees and 60 degrees, multiplying the signal proportional to the difference between the actual speed and the control speed by a proportionality factor between one and zero; and if the roll angle is greater than 60 degrees, multiplying the signal proportional to the difference between the actual speed and the control speed by zero.

9. The method of claim 5 wherein the step of producing the first control signal further includes the step of adding an augmentation component to the signal proportional to the difference between the actual speed and the trigger speed.

10. The method of claim 9 wherein the step of adding an augmentation component to the signal proportional to the difference between the actual speed and the control speed includes the steps of:

monitoring flight path acceleration;

producing an augmentation component corresponding to the monitored flight path acceleration; and adding the augmentation component to the signal proportional to the difference between the actual speed and the trigger speed.

11. Apparatus for producing an overspeed override signal in an aircraft having an autopilot, comprising:

a flight speed monitor producing an electrical signal corresponding to a monitored flight speed;

a target speed signal generator having an activation input, the target signal generator producing a target signal, the target signal corresponding to a maximum allowable speed in response to a first control signal at the activation input and the target signal corresponding to a reduced allowable speed less than the maximum allowable speed in response to a second control signal at the activation input;

an error signal generator having a first input coupled to receive the electrical signal from the flight speed monitor and a second input coupled to receive the target signal from the target speed signal generator, the error signal generator producing an error signal corresponding to the difference between the target speed and the monitored flight speed in response to the target signal and the electrical signal from the flight speed monitor;

a logic circuit coupled to receive the error signal, the logic circuit having an activation output coupled to the activation input of the target signal generator, the logic circuit producing the second control signal in response to the error signal corresponding to the monitored flight speed exceeding the target speed; and an override signal generator connected to receive the error signal and the second control signal, the override signal generator producing an override signal corresponding to the error signal in response to the second control signal and the error signal.

12. The apparatus of claim 11, further including:

a latch circuit having an unlatch input, the latch circuit coupled to maintain the second control signal at the activation input of the target signal generator until an unlatch signal is received at the unlatch input.

13. The apparatus of claim 11, further including:

a roll angle detector producing a roll angle signal; and a weighting circuit connected to receive the roll angle signal, the weighting circuit further being connected to weight the override signal in response to the roll angle signal.

14. The apparatus of claim 13 wherein the weighting circuit applies a weight of zero at roll angles greater than a maximum roll angle.

15. The apparatus of claim 14 wherein the weighting circuit applies a weight of one at roll angles less than a nominal roll angle.

* * * * *